(12) United States Patent
Witte et al.

(10) Patent No.: US 10,753,469 B2
(45) Date of Patent: Aug. 25, 2020

(54) HYDROSTATIC TRANSMISSION AND METHOD FOR BRAKING USING THE SAME

(71) Applicant: Robert Bosch GmbH, Stuttgart (DE)

(72) Inventors: Heiko Witte, Ulm (DE); Martin Behm, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 15/894,769

(22) Filed: Feb. 12, 2018

(65) Prior Publication Data

US 2018/0231119 A1 Aug. 16, 2018

(30) Foreign Application Priority Data

Feb. 14, 2017 (DE) .................. 10 2017 202 276

(51) Int. Cl.
| | |
|---|---|
| F16H 61/4157 | (2010.01) |
| F16H 61/4017 | (2010.01) |
| F16H 39/10 | (2006.01) |
| F16H 61/46 | (2010.01) |
| F16H 61/425 | (2010.01) |
| F16H 61/438 | (2010.01) |
| F16H 61/435 | (2010.01) |
| F16H 59/18 | (2006.01) |
| F16H 59/44 | (2006.01) |
| F16H 59/36 | (2006.01) |
| F16H 59/68 | (2006.01) |

(52) U.S. Cl.
CPC ......... *F16H 61/4157* (2013.01); *F16H 39/10* (2013.01); *F16H 61/4017* (2013.01); *F16H 61/425* (2013.01); *F16H 61/435* (2013.01); *F16H 61/438* (2013.01); *F16H 61/46* (2013.01); *F16H 59/18* (2013.01); *F16H 59/44* (2013.01); *F16H 59/68* (2013.01); *F16H 2059/366* (2013.01); *F16H 2059/6876* (2013.01)

(58) Field of Classification Search
CPC ............ F16H 61/4017; F16H 61/4157; F16H 61/446; F16H 61/46
USPC .......................................................... 60/490
See application file for complete search history.

(56) References Cited

U.S. PATENT DOCUMENTS

| | | | |
|---|---|---|---|
| 2011/0178684 A1* | 7/2011 | Umemoto | F16H 61/421 701/51 |
| 2014/0372000 A1* | 12/2014 | Rozycki | F16H 61/421 701/58 |

FOREIGN PATENT DOCUMENTS

| | | |
|---|---|---|
| DE | 10 2014 211 393 A1 | 12/2014 |
| EP | 1 960 699 B1 | 8/2008 |

* cited by examiner

*Primary Examiner* — Thomas E Lazo
*Assistant Examiner* — Daniel S Collins
(74) *Attorney, Agent, or Firm* — Maginot, Moore & Beck LLP

(57) ABSTRACT

A hydrostatic transmission for a traction drive of a mobile working machine includes a variable-displacement pump and one or more motors connected to one another in a closed hydraulic circuit. An electronic control unit of the hydrostatic transmission is configured to initiate and to end a braking operation by the hydrostatic transmission if a traveling speed of the mobile working machine reaches a threshold value. The threshold value is adjustable by the electronic control unit automatically or in a manner dependent on a driver demand. The braking torque is also adjustable.

14 Claims, 1 Drawing Sheet

HYDROSTATIC TRANSMISSION AND METHOD FOR BRAKING USING THE SAME

This application claims priority under 35 U.S.C. § 119 to patent application no. DE 10 2017 202 276.0, filed on Feb. 14, 2017 in Germany, the disclosure of which is incorporated herein by reference in its entirety.

The disclosure relates to a hydrostatic transmission with which a hydrostatic braking operation is possible, and to a method for the braking of a vehicle having a hydrostatic transmission of said type.

BACKGROUND

The prior art has disclosed hydrostatic transmissions for mobile working machines in which a hydrostatic pump (primary unit) and at least one hydrostatic motor (secondary unit, are fluidically connected to one another by means of a closed hydraulic circuit. A primary unit may be situated with multiple secondary units in a closed hydraulic circuit, wherein the secondary units are arranged in parallel with respect to one another in terms of the circuit configuration. An internal combustion engine, for example a diesel engine of the mobile working machine, is coupled rotationally conjointly to the primary unit, and an output, for example an axle or a wheel of the mobile working machine, is coupled rotationally conjointly to the secondary unit. The mobile working machine thus has a traction drive which has a hydrostatic transmission.

The document EP 1 960 699 B1 discloses a hydrostatic transmission with which braking can also be performed. Here, in relation to traction operation, the power flows in the reversed direction from the output, via the secondary unit acting as a pump and via the primary unit acting as a motor, to the internal combustion engine, which is then driven in a passive cranking operating mode. The highly pressurized working line of the closed circuit is in this case safeguarded by means of a pressure-limiting valve, by means of which, too, a part of the braking power can be dissipated during the braking operation. In the case of said solution, however, the braking operation is triggered only when the driver explicitly expresses the demand by means of an actuation of the brake pedal.

The documents DE 10 2014 211 393 A1 and US 2014/0372000 A1 each disclose a hydrostatic transmission with which braking can also be performed. Here, it is sought to protect the internal combustion engine against overspeeding. For this purpose, a speed control system is described which identifies an overshooting of the braking power of the internal combustion engine and thereupon automatically triggers a high-power braking operation. A first part of the braking power is output to the internal combustion engine, whereas a second part of the braking power is converted by means of the pressure-limiting valve of the high-pressure line in question into heat.

It is furthermore known from the prior art to automatically initiate a braking operation by means of a hydrostatic transmission if the traveling speed of the mobile working machine in question becomes too high. Here, 2-position closed-loop controllers are used, such that the braking operation is activated if a maximum speed or activation threshold is overshot. A fixedly set braking torque then acts until the traveling speed falls below a deactivation threshold.

A disadvantage of such monitoring of the traveling speed is that the activation threshold and the deactivation threshold are fixedly set values. It may thus be the case, for example when the mobile working machine in question is traveling downhill, that the automatic braking is repeatedly initiated and ended again in an unpleasant and technically suboptimum manner.

By contrast to this, it is the object of the disclosure to provide a hydrostatic transmission and a method with which these disadvantages are avoided.

SUMMARY

The claimed hydrostatic transmission is provided for a traction drive which has an internal combustion engine, for example a diesel engine, and an output, for example a wheel or an axle. The hydrostatic transmission has a driveshaft, which is couplable to the internal combustion engine of the traction drive, of a primary unit which operates as a pump during traction operation, and at least one secondary unit, which is couplable to an output of the traction drive and which operates as a motor during traction operation. A primary unit may be assigned one or more secondary units, for example four secondary units on two axles and four wheels in the case of a field sprayer, or one secondary unit in the case of a forklift truck. The primary unit and the secondary unit(s) are fluidically connected to one another by means of two working lines of a closed hydraulic circuit. The primary unit has an adjustable pivot angle and thus an adjustable swept volume, which pivot angle or swept volume is controllable by an electrical control unit during a braking operation of the hydrostatic transmission. By means of the control unit, a braking operation can be automatically initiated if an actual traveling speed of the mobile working machine or a variable derived from the former, for example an actual rotational speed of the secondary unit, reaches an activation threshold of the traveling speed or an activation threshold derived from the former, for example an activation threshold of the rotational speed of the secondary unit. According to the disclosure, the activation threshold is variable or adjustable. It is thus possible, for example when the mobile working machine in question is traveling downhill, for the automatic braking to be initiated, performed and ended again in a more pleasant and technically optimum manner. The actual traveling speed may also, rather than the stated monitoring of the derived variable, be provided in a manner directly detected by the control unit.

If the activation threshold is adjustable by means of a driver demand, in particular by means of an operating element, for example by means of a brake pedal or else by means of an accelerator pedal or an accelerator lever or by means of an automatic speed controller, the foresight of the driver can be advantageously utilized. For example, the activation threshold can be reduced by the driver if he or she knows that the mobile working machine is heavily laden or that the gradient ahead is steep.

The derived activation threshold is preferably equal to the sum of a setpoint rotational speed, derived from the driver demand, of the secondary unit and an added-on value.

It is preferable if the braking operation can also be automatically ended as a result of a decrease of the actual traveling speed of the mobile working machine or of the variable derived from the former below a deactivation threshold of the traveling speed or a deactivation threshold derived from the former, for example a deactivation threshold of the rotational speed of the secondary unit, and if the deactivation threshold is also variable or adjustable.

The derived deactivation threshold also arises preferably from the sum of the setpoint rotational speed, derived from the driver demand, of the secondary unit and an added-on value.

The activation threshold and/or the deactivation threshold are preferably also automatically adjustable by the control unit. This could be performed for example in a manner dependent on an automatically detected loading situation of the mobile working machine in question or in a manner dependent on an actual rotational speed of the internal combustion engine that must not be exceeded.

It is then advantageous if the control unit is designed such that a braking operation can be initiated and ended also on the basis of automatic monitoring of the actual rotational speed of the internal combustion engine or of a variable derived therefrom, for example a rotational speed of the primary unit.

If the secondary unit also has an adjustable pivot angle and thus an adjustable swept volume, which pivot angle or swept volume is controllable by the control unit during the braking operation, it is furthermore possible for a braking torque to be adjusted during the braking operation.

According to a first variant, the braking torque can be controllable, or controllable in closed-loop fashion, in a manner dependent on a difference between, on the one hand, the actual traveling speed or the variable derived from the former and, on the other hand, a setpoint traveling speed or the variable derived from the former, in particular the setpoint rotational speed of the secondary unit.

According to a second variant, the braking torque can be controllable, or controllable in closed-loop fashion, in a manner dependent on a difference between, on the one hand, the actual traveling speed or the variable derived from the former and, on the other hand, a maximum traveling speed or a variable derived from the former, maximum rotational speed of the secondary unit.

To permit a high-power braking operation, it is particularly preferable if in each case one pressure-limiting valve is arranged on both working lines. A first part of the braking power can be dissipated via the pressure-limiting valve involved, whereas a second part of the braking power can be dissipated via the primary unit and via the internal combustion engine. The braking power that can be realized is particularly high if the first part is greater than the second part.

If, during the high-power braking operation, the volume flow via the primary unit increases, the volume flow via the related pressure-limiting valve decreases. Thus, the pressure in the working line at high pressure can fall. To minimize this pressure reduction or to keep the pressure approximately constant, pressure-limiting valves are preferred which have a flat characteristic curve with regard to their pressure difference as a function of their passed-through volume flow.

In a preferred refinement of the hydrostatic transmission according to the disclosure, the pivot angle and the swept volume of the primary unit are adjustable in both directions from a zero position. The traction drive in question can thus, with a constant direction of rotation of the internal combustion engine, be utilized in traction operation in both directions of travel of the mobile working machine, and can correspondingly be braked according to the disclosure in both directions.

In a refinement of the hydrostatic transmission according to the disclosure which is simple in terms of apparatus, the primary unit is a load-sensing axial piston machine, during the pump operation of which forces act in the direction of a decrease of its pivot angle, which forces are dependent on a pressure difference between the two working lines and a rotational speed of the driveshaft and the pivot angle. Then, in the control unit, there is stored a characteristic map of the primary unit in which the pressure difference and the rotational speed are assigned a respective pivot angle, as a result of which no feedback of the pivot angle is required.

It is preferable here if the control unit, by means of an electrical setting pressure valve and a setting cylinder of an adjustment device of the primary unit, can control a setting pressure, wherein the setting pressure acts in the direction of an increase of the pivot angle of said primary unit, and wherein the dependency of the setting pressure or of a setting pressure deviation on the pressure difference between the two working lines and on the rotational speed of the driveshaft and on the pivot angle or on the swept volume is stored in the characteristic map.

In another refinement of the hydrostatic transmission according to the disclosure, the pivot angle and the swept volume of the primary unit are adjustable by means of an adjustment device which exhibits feedback of the pivot angle. The adjustment device may be an electroproportional (EP) adjustment device.

The method according to the disclosure serves for the closed-loop control of a braking operation with the above-described hydrostatic transmission, and has the following steps: firstly, according to the disclosure, the activation threshold of the traveling speed, or the activation threshold derived from the former, is adjusted. Then, the actual traveling speed of the mobile working machine, or the variable derived from the former, reaches the activation threshold, whereupon the braking operation of the hydrostatic transmission is automatically initiated by means of the control unit. It is thus possible, for example when the mobile working machine in question is traveling downhill, for the automatic braking operation to be initiated, performed and ended again in a more pleasant and technically optimum manner.

It is particularly preferable if the braking operation is performed with a variable or adjustable braking torque.

A preferred refinement of the method additionally has the following steps: the deactivation threshold of the traveling speed, or the deactivation threshold derived from the former, is also adjusted. After the initiation of the braking operation and the braking with variable or adjustable braking torque, the actual traveling speed of the mobile working machine, or the variable derived from the former, reaches the deactivation threshold, whereupon the braking operation of the hydrostatic transmission is automatically ended by means of the control unit.

An exemplary embodiment of the transmission according to the disclosure is illustrated in the drawings. The traction drive will now be discussed in more detail on the basis of the figures of said drawings.

DETAILED DESCRIPTION

Figure 1:
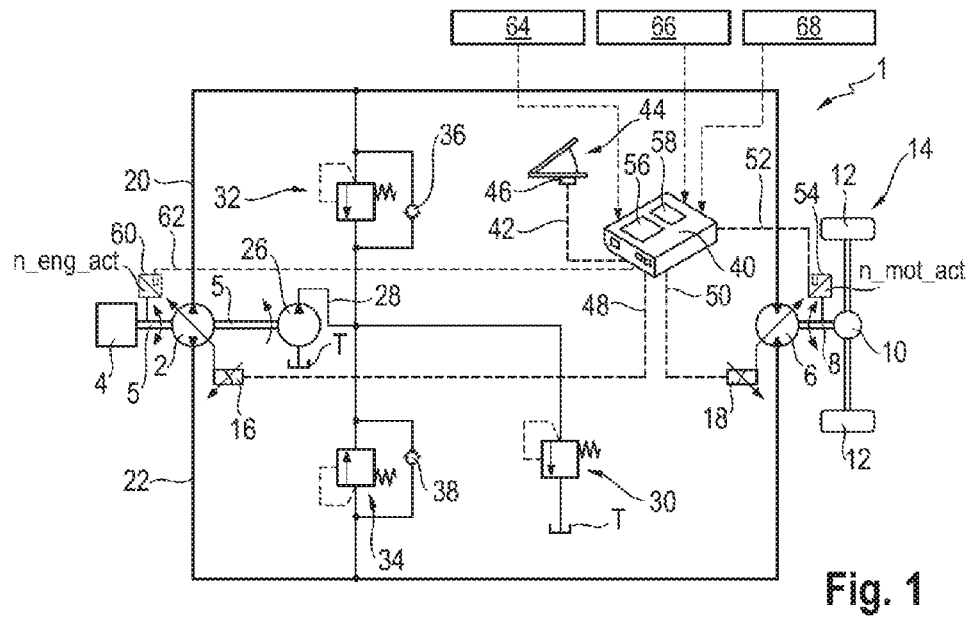
FIG. 1 shows a circuit diagram of a traction drive having a hydrostatic transmission according to the disclosure as per the exemplary embodiment.

According to FIG. 1, a hydrostatic traction drive has a hydrostatic transmission 1 with a hydrostatic primary unit 2 which is operated primarily as a hydraulic pump and which is driven by an internal combustion engine 4, designed as a diesel engine, via a driveshaft 5. Furthermore, the hydrostatic transmission 1 has a hydrostatic secondary unit 6, which is coupled via a driveshaft 8 to an axle 14 which has two wheels 12, and which is operated primarily as a hydraulic motor. More specifically, the driveshaft 8 is coupled to a differential transmission 10 of the axle 14.

Both hydraulic machines 2, 6 are adjustable in terms of their swept volume Vg_pump, Vg_mot by means of a respective adjustment device 16, 18. The first hydraulic machine 2 is fluidically connected to the secondary unit 6 in a closed hydraulic circuit via a first working line 20, which in the further explanations is the feed line and via which pressure medium flows from the primary unit 2 to the secondary unit 6, and via a second working line 22, which in the further explanations is the return line and via which pressure medium flows from the secondary unit 6 to the primary unit 2.

The hydrostatic transmission 1 has a feed pump 26 which is connected to the driveshaft 5 of the primary unit 2 and which can deliver pressure medium from a tank T into a feed line 28. The latter branches into three branches, wherein a first branch can be placed in pressure-medium-conducting connection with the tank T via a pressure-limiting valve 30. A second and a third branch can be connected in pressure-medium-conducting fashion via a respective pressure-limiting valve 32, 34, of which each has an integrated replenishment check valve 36, 38, to the branch line 20 and to the branch line 22 respectively.

Both units 2, 6 are operable in all four quadrants, such that both the flow direction of the pressure medium in the closed hydraulic circuit and the direction of rotation of each of the units 2, 6 is reversible.

The hydrostatic transmission 1 has a control unit 40 to which a brake pedal 44 is connected via a signal line 42. The brake pedal 44 has a sensor 46 by means of which an actuation intensity of the brake pedal 44 can be detected and transmitted via the signal line 42 to the control unit 40. The latter is connected via an electrical signal line 48 to the adjustment device 16 of the primary unit 2 and via an electrical signal line 50 to the adjustment device 18 of the secondary unit 6.

Via an electrical signal line 52, a rotational speed detection unit 54 by means of which an actual rotational speed n_mot_act of the secondary unit 6 can be detected at the driveshaft 8 is connected to the control unit 40. Via an electrical signal line 62, a rotational speed detection unit 60 by means of which an actual rotational speed n_pump_act of the primary unit 2 can be detected at its driveshaft 5 is connected to the control unit 40. Owing to the fact that the driveshaft 5 is formed in one piece with a crankshaft of the internal combustion engine 4, an actual rotational speed n_eng_act of the internal combustion engine 4 is also detected by means of the rotational speed detection unit 60.

Use may also be made of a rotational speed signal which is provided by the internal combustion engine as a CAN bus signal. A sensor is likewise required for this purpose. Said sensor is however then read in by an engine control unit and provided via a CAN bus.

The control unit 40 has a memory unit 56, in which the braking method according to the disclosure is stored, and a processing unit 58, in which the braking method can be executed.

During the braking operation by means of the hydrostatic transmission 1 according to the disclosure, the axle 14 is supported, via the driveshaft 8 and via the secondary unit 6 operating as a pump and via one of the two working lines 22 and via the primary unit 2 operating as a motor and via the driveshaft 5 of the primary unit 2, on the internal combustion engine 4, which is then cranked and, by means of its friction and acceleration forces of the pistons, dissipates at least a part of the braking energy of the mobile working machine.

Furthermore, an automatic speed controller 64, an accelerator pedal 66 and an accelerator lever 68 are electrically connected via respective signal lines to the control unit 40. The accelerator pedal and accelerator lever may also be provided alternatively.

During the operation of the hydrostatic transmission 1 according to the disclosure, the control unit 40 calculates a setpoint rotational speed n_mot_des of the driveshaft 8 of the secondary unit 2 from the setting of the automatic speed controller 64 or the position of the accelerator pedal 66 or of the accelerator lever 68, which all constitute a driver demand, because said setpoint rotational speed is proportional to the setpoint traveling speed v_veh_des of the mobile working machine in question. Correspondingly, the actual traveling speed v_veh_act is inferred from the actual rotational speed n_mot_act of the secondary unit 6, wherein the braking operation according to the disclosure is initiated by means of the control unit 40 in the presence of an excessively large deviation.

Figure 2:
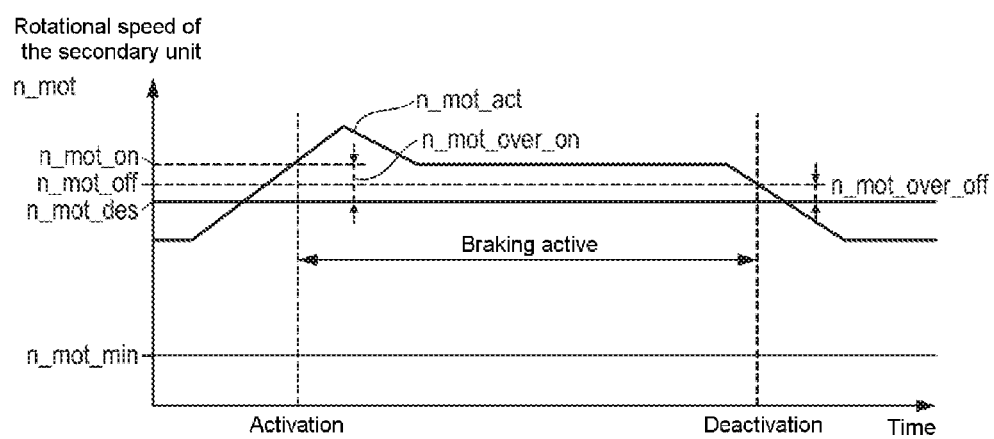
FIG. 2 shows a diagram of the rotational speeds of the primary unit of the transmission from FIG. 1.

FIG. 2 shows, in a profile with respect to time, firstly an activation, that is to say the automatic initiation of the braking operation, and subsequently a deactivation, that is to say the automatic ending of the braking operation. The rotational speed n_mot of the secondary unit 6 is illustrated with respect to the time. More specifically, the actual rotational speed n_mot_act of the secondary unit 6 is schematically illustrated. It can be seen that, in the case of an increasing actual rotational speed n_mot_act of the secondary unit 2, the activation occurs when said actual rotational speed reaches an activation threshold n_mot_on. This is the sum of the setpoint rotational speed n_mot_des and an added-on value n_mot_over_on. In other words, the braking operation is activated by means of the activation trigger:

$n\_mot\_act - n\_mot\_des > n\_mot\_over\_on.$

If the traveling speed has been decreased as a result of said braking operation and/or as a result of a change in topology and/or as a result of the use of an additional mechanical brake (not shown) to a traveling speed of which the derived variable n_mot_act lies above or below the variable n_mot_des derived from the demanded setpoint traveling speed v_veh_des by only a small added-on value n_mot_over_off, then the braking operation is deactivated again. More specifically, the deactivation trigger is as follows:

$n\_mot\_act - n\_mot\_des < n\_mot\_over\_off.$

In the case of protection of components against overspeeding, there is, as before, an upper speed threshold which can likewise be referred to as n_mot_des, upon the overshooting of which the braking operation is activated. The deactivation is performed if a speed is reached which lies slightly below or above the maximum speed, determined by the type of construction, of the mobile working machine.

A hydrostatic transmission for a traction drive is disclosed, wherein a variable-displacement pump and one or more motors are connected to one another in a closed hydraulic circuit. By means of an electronic control unit, a braking operation by means of the transmission can be initiated and ended if the traveling speed reaches a threshold value. Said threshold value is, according to the disclosure, adjustable by the control unit automatically or in a manner dependent on a driver demand. The braking torque is preferably also adjustable.

LIST OF REFERENCE DESIGNATIONS

1 Hydrostatic transmission
2 Primary unit

4 Internal combustion engine
5 Driveshaft
6 Secondary unit
8 Driveshaft
10 Differential transmission
12 Wheel
14 Output/axle
16 Adjustment device
18 Adjustment device
20 Working line
22 Working line
24 Driveshaft
26 Feed pump
28 Feed line
30 Pressure-limiting valve
32 Pressure-limiting valve
34 Pressure-limiting valve
36 Replenishment check valve
38 Replenishment check valve
40 Control unit
42 Signal line
44 Brake pedal
46 Sensor
48 Signal line
50 Signal line
52 Signal line
54 Rotational speed detection unit
56 Memory unit
58 Processor unit
60 Rotational speed detection unit
62 Signal line
64 Automatic speed controller
66 Accelerator pedal
68 Accelerator lever
n_mot_act Actual rotational speed of the secondary unit
n_mot_des Setpoint rotational speed of the secondary unit
n_mot_max Maximum rotational speed of the secondary unit, derived from the maximum traveling speed
n_mot_min Minimum rotational speed of the secondary unit
n_mot_on Activation threshold of the rotational speed of the secondary unit
n_mot_over_on Added-on value of the rotational speed of the secondary unit during the activation
n_mot_off Deactivation threshold of the rotational speed of the secondary unit
n_mot_over_off Added-on value of the rotational speed of the secondary unit during the deactivation
v_veh_act Actual traveling speed
v_veh_des Setpoint traveling speed
v_veh_max Maximum traveling speed
v_veh_on Activation threshold of the traveling speed
v_veh_off Deactivation threshold of the traveling speed
T Tank

What is claimed is:

1. A hydrostatic transmission for a traction drive of a mobile working machine, comprising:
    a primary unit including a driveshaft coupled to an internal combustion engine of the traction drive;
    at least one secondary unit coupled to an output of the traction drive;
    two working lines of a closed circuit each configured to fluidically connect the primary unit and the at least one secondary unit; and
    an electrical control unit configured to control an adjustable pivot angle or an adjustable swept volume of the primary unit during a braking operation of the hydrostatic transmission,
    wherein the electrical control unit is further configured to automatically initiate the braking operation if an actual traveling speed of the mobile working machine or a variable derived from the former reaches an activation threshold of the traveling speed or an activation threshold derived from the former, and
    wherein the activation threshold is variable or adjustable, and
    further comprising:
        a first pressure-limiting valve arranged on a first working line of the two working lines; and
        a second pressure-limiting valve arranged on a second working line of the two working lines,
    wherein the braking operation is a high-power braking operation in which a first part of the braking power is dissipated via one of the first and the second pressure-limiting valves, while a second part of the braking power is dissipated via the primary unit, and
    wherein the first and second pressure-limiting valves each have a flat characteristic curve with regard to their pressure difference as a function of their passed-through volume flow.

2. The hydrostatic transmission according to claim 1, wherein the activation threshold is adjustable based on a driver demand.

3. The hydrostatic transmission according to claim 2, wherein the activation threshold is equal to a sum of a setpoint rotational speed, derived from the driver demand, of the at least one secondary unit and an added-on value.

4. The hydrostatic transmission according to claim 3, wherein:
    the braking operation is automatically ended as a result of a decrease of the actual traveling speed of the mobile working machine or of the variable derived from the former below a deactivation threshold of the traveling speed or a deactivation threshold derived from the former, and
    the deactivation threshold is variable or adjustable.

5. The hydrostatic transmission according to claim 4, wherein the deactivation threshold is equal to a sum of the setpoint rotational speed, derived from the driver demand, of the at least one secondary unit and another added-on value.

6. The hydrostatic transmission according to claim 1, wherein the electrical control unit is further configured such that the braking operation is automatically initiated and ended based on automatic monitoring of an actual rotational speed of the internal combustion engine or of a variable derived from the former.

7. The hydrostatic transmission according to claim 1, wherein the electrical control unit is further configured to control an adjustable pivot angle or an adjustable swept volume of the at least one secondary unit during the braking operation.

8. The hydrostatic transmission according to claim 1, wherein a braking torque is variable or adjustable during the braking operation.

9. The hydrostatic transmission according to claim 8, wherein the braking torque is controllable, or controllable in closed-loop fashion, in a manner dependent on a difference between the actual traveling speed or the variable derived from the former and a setpoint traveling speed or a variable derived from the former.

10. The hydrostatic transmission according to claim 8, wherein the braking torque is controllable, or controllable in closed-loop fashion, in a manner dependent on a difference between the actual traveling speed or the variable derived from the former and a maximum traveling speed or a variable derived from the former.

11. The hydrostatic transmission according to claim 1, wherein the pivot angle and the swept volume of the primary unit are adjustable in both directions from a zero position.

12. A method for closed-loop control of a braking operation with a hydrostatic transmission for a traction drive of a mobile working machine, comprising:
   determining an activation threshold of a traveling speed or of the activation threshold derived from the former;
   attaining an actual traveling speed or a variable, derived from the former, of the activation threshold; and
   automatically initiating a braking operation of the hydrostatic transmission using an electrical control unit,
   wherein the hydrostatic transmission includes
      a primary unit including a driveshaft coupled to an internal combustion engine of the traction drive,
      at least one secondary unit coupled to an output of the traction drive,
      two working lines of a closed circuit each configured to fluidically connect the primary unit and the at least one secondary unit, and
      the electrical control unit,
   wherein the electrical control unit is further configured to control an adjustable pivot angle or an adjustable swept volume of the primary unit during the braking operation of the hydrostatic transmission, and
   wherein the activation threshold is adjustable based on a driver demand, and
   wherein the activation threshold is equal to a sum of a setpoint rotational speed, derived from the driver demand, of the at least one secondary unit and an added-on value.

13. The method according to claim 12, further comprising:
   determining a deactivation threshold of the traveling speed or of the deactivation threshold derived from the former;
   attaining the actual traveling speed or the variable, derived from the former, of the deactivation threshold; and
   automatically ending the braking operation of the hydrostatic transmission using the electrical control unit.

14. A hydrostatic transmission for a traction drive of a mobile working machine, comprising:
   a primary unit including a driveshaft coupled to an internal combustion engine of the traction drive;
   at least one secondary unit coupled to an output of the traction drive;
   two working lines of a closed circuit each configured to fluidically connect the primary unit and the at least one secondary unit; and
   an electrical control unit configured to control an adjustable pivot angle or an adjustable swept volume of the primary unit during a braking operation of the hydrostatic transmission,
   wherein the electrical control unit is further configured to automatically initiate the braking operation if an actual traveling speed of the mobile working machine or a variable derived from the former reaches an activation threshold of the traveling speed or an activation threshold derived from the former, and
   wherein the activation threshold is adjustable based on a driver demand, and
   wherein the activation threshold is equal to a sum of a setpoint rotational speed, derived from the driver demand, of the at least one secondary unit and an added-on value.

* * * * *